(12) United States Patent
Babakhani et al.

(10) Patent No.: US 8,957,810 B2
(45) Date of Patent: *Feb. 17, 2015

(54) NEAR-FIELD MILLIMETER WAVE IMAGING

(75) Inventors: Aydin Babakhani, Houston, TX (US); Duixian Liu, Scarsdale, NY (US); Scott K. Reynolds, Amawalk, NY (US); Mihai A. Sanduleanu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/600,930

(22) Filed: Aug. 31, 2012

(65) Prior Publication Data

US 2013/0027244 A1 Jan. 31, 2013

Related U.S. Application Data

(63) Continuation of application No. 13/545,437, filed on Jul. 10, 2012.

(60) Provisional application No. 61/513,138, filed on Jul. 29, 2011.

(51) Int. Cl.
*G01S 13/89* (2006.01)
*H01Q 1/22* (2006.01)
*H01Q 7/00* (2006.01)
*H01Q 21/06* (2006.01)

(52) U.S. Cl.
CPC .............. *G01S 13/89* (2013.01); *H01Q 1/2283* (2013.01); *H01Q 7/00* (2013.01); *H01Q 21/061* (2013.01)

USPC .............................. 342/179; 342/22; 324/337

(58) Field of Classification Search
CPC ............................. G01S 13/885; G01S 13/88
USPC ...................................... 342/22, 27, 179, 360
See application file for complete search history.

(56) References Cited

U.S. PATENT DOCUMENTS

| 5,227,800 | A | | 7/1993 | Huguenin et al. |
| 5,864,088 | A | * | 1/1999 | Sato et al. ..................... 174/386 |
| 5,936,237 | A | * | 8/1999 | van der Weide ............. 250/234 |
| 6,123,261 | A | | 9/2000 | Roustaei |
| 6,353,224 | B1 | | 3/2002 | Sinclair et al. |
| 6,618,463 | B1 | | 9/2003 | Schotland et al. |
| 7,190,168 | B2 | * | 3/2007 | Fujiwara ....................... 324/337 |
| 7,205,769 | B2 | * | 4/2007 | Fujiwara ....................... 324/337 |
| 7,502,605 | B2 | | 3/2009 | Castiglione et al. |

(Continued)

OTHER PUBLICATIONS

Near field millimeter wave microscopy with conical Teflon probes Manoja D. Weiss, Brian Zadler, Scott Schafer, and John Scales Citation: J. Appl. Phys. 106, 044912 (2009); doi: 10.1063/1.3194314.*

(Continued)

*Primary Examiner* — John B Sotomayor
*Assistant Examiner* — Marcus Windrich
(74) *Attorney, Agent, or Firm* — Anne V. Dougherty; Ryan, Mason & Lewis, LLP

(57) ABSTRACT

Systems and method for near-field millimeter wave imaging are provided, in particular, near-field millimeter wave imaging systems and methods that enable sub-wavelength resolution imaging by scanning objects with sub-wavelength probe elements and capturing and measuring phase and intensity of reflected energy to generate images.

12 Claims, 17 Drawing Sheets

(56) References Cited

U.S. PATENT DOCUMENTS

| | | | |
|---|---|---|---|
| 7,502,631 | B2 | 3/2009 | Hashemi et al. |
| 7,656,346 | B2 | 2/2010 | Nohmi |
| 7,725,151 | B2 | 5/2010 | van der Weide |
| 7,812,775 | B2 | 10/2010 | Babakhani et al. |
| 7,912,527 | B2 | 3/2011 | Robertson et al. |
| 8,148,688 | B2 | 4/2012 | Kawano et al. |
| 2002/0175849 | A1* | 11/2002 | Arndt et al. .................... 342/22 |
| 2003/0102995 | A1* | 6/2003 | Stolarczyk et al. ............. 342/22 |
| 2009/0289869 | A1 | 11/2009 | Babakhani et al. |
| 2010/0149038 | A1* | 6/2010 | Brown et al. ................. 342/360 |
| 2010/0231452 | A1 | 9/2010 | Babakhani et al. |
| 2011/0032253 | A1 | 2/2011 | Zaman et al. |
| 2011/0128179 | A1* | 6/2011 | Apostolos et al. ............. 342/22 |

OTHER PUBLICATIONS

R.W. McMillan et al., "Concealed Weapon Detection Using Microwave and Millimeter Wave Sensors," IEEE International Conference on Microwave and Millimeter Wave Technology (ICMMT), 1998, pp. 1-4.

D.M. Sheen et al., "Near Field Imaging at Microwave and Millimeter Wave Frequencies," IEEE/MMT-S International Microwave Symposium, Jun. 2007, pp. 1693-1696.

E. Öjefors et al., "A 0.65 THz Focal-Plane Array in a Quarter-Micron CMOS Process Technology," IEEE Journal of Solid-State Circuits, Jul. 2009, pp. 1968-1976, vol. 44, No. 7.

S. Maslovski et al., "Subwavelength-Resolution Imaging Device Based on Frequency Scanning," IEEE Asia-Pacific Microwave Conference (APMC), Dec. 2008, 4 pages.

Z. Yu et al., "Keynote Address II Towards Sub-Millimeter Wave CMOS Circuits," 11th IEEE International Conference on Communications Technology (ICCT), Nov. 2008, 1 page.

Xiang Guan, "Microwave Integrated Phased Array Receivers in Silicon," California Institute of Technology (Caltech), Ph.D. Thesis, Sep. 2005, 180 pages.

A.F. Lann et al., "Combined Millimeter-Wave Near-Field Microscope and Capacitance Distance Control for the Quantitative Mapping of Sheet Resistance of Conducting Layers," American Institute of Physics, Applied Physics Letters, Nov. 1998, pp. 2832-2834, vol. 73, No. 19.

M. Golosovsky et al., "High-Spatial Resolution Resistivity Mapping of Large-Area YBCO Films by a Near-Field Millimeter-Wave Microscope," IEEE Transactions on Microwave Theory and Techniques, Jul. 1996, pp. 1390-1392, vol. 44, No. 7.

M. Golosovsky et al., "Novel Millimeter-Wave Near-Field Resistivity Microscope," American Institute of Physics, Applied Physics Letters, Mar. 1996, pp. 1579-1581, vol. 68, No. 11.

I.V. Minin et al., "Concept of Near-Field Millimeter-Wave Imaging System with a Spatial Resolution Beyond the Abbe Barrier," China-Japan Joint Microwave Conference, Sep. 2008, pp. 509-512.

PCT International Search Report and Written Opinion, dated Sep. 28, 2012, for counterpart PCT Application PCT/US2012/046143.

* cited by examiner

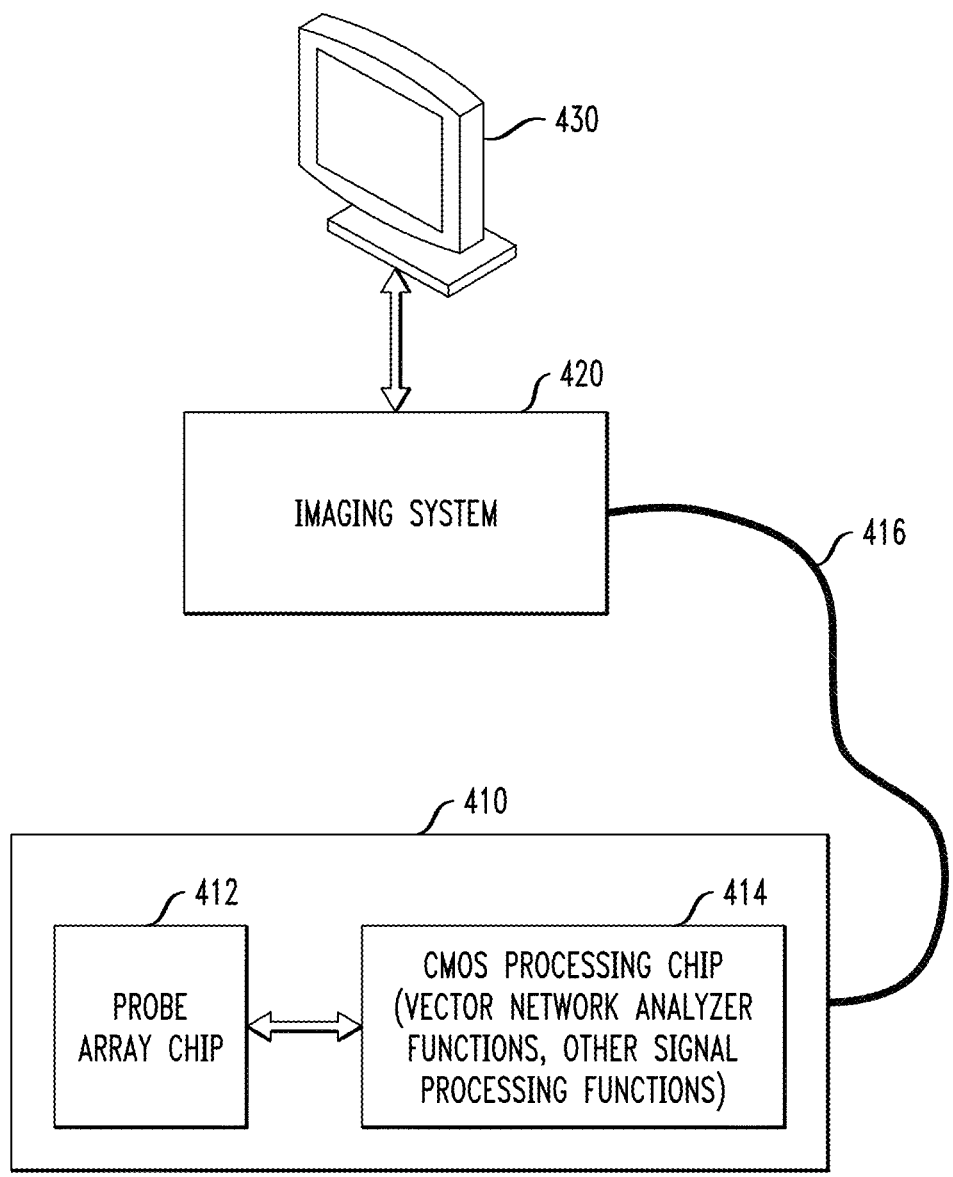

NEAR-FIELD MILLIMETER WAVE IMAGING

CROSS-REFERENCE TO RELATED APPLICATIONS

This application is a Continuation of U.S. patent application Ser. No. 13/545,437, filed on Jul. 10, 2012, which claims priority to U.S. Provisional Patent Application No. 61/513,138, filed on Jul. 29, 2011, the disclosures of which are fully incorporated herein by reference.

TECHNICAL FIELD

The field generally relates to systems and method for near-field millimeter wave imaging and, in particular, near-field millimeter wave imaging systems and methods that enable sub-wavelength resolution imaging by scanning objects with sub-wavelength probe elements and capturing and measuring the phase and intensity of reflected energy to generate images.

BACKGROUND

In general, conventional far-field millimeter wave imaging systems have been widely used in various applications such as security screening (e.g., concealed weapon detection), collision avoidance radars, and for safe landing in poor-visibility conditions. These conventional systems are usually very expensive, complex, and bulky. For example, one known conventional imaging system is based on a complex passive millimeter wave video camera having 1024 receiver modules operating at 89 GHz. In this system, an 18-inch diameter plastic lens is used to collect and focus radiation yielding a diffraction-limited 0.5° angular resolution.

Although the image quality of these systems is impressive, due to the complexity of these far-field imagers and their cost, they have not been used in many high-volume applications such as medical imaging. In addition to their high cost, the resolution achieved by these imagers is not high enough to be used in medical applications, where a resolution of 1 mm or less is required. These systems perform far-field imaging where the highest image resolution that can be achieved is set by the diffraction limit. For example, a commercially available 18-inch 89 GHz camera has an angular resolution of 0.5° which is equivalent to 8.7 mm spatial resolution for an antenna-object distance of 1 m. Thus, two main drawbacks of current far-field imagers that prevent them from being used in medical applications are their high cost and low resolution set by the diffraction limit.

SUMMARY

In general, exemplary embodiments of the invention include systems and method for near-field millimeter wave imaging and, in particular, near-field millimeter wave imaging systems and methods that enable sub-wavelength resolution imaging by scanning objects with sub-wavelength probe elements and capturing and measuring phase and intensity of reflected energy to generate images.

In one exemplary embodiment of the invention, a near-field imaging system includes a scanning device and an imager. The scanning device is adapted to scan a surface of a target object by emitting electromagnetic energy having a wavelength at a given operating frequency, capturing reflected electromagnetic energy from the target object, and by measuring an intensity and phase of the reflected energy. The scanning device includes a probe having sub-wavelength dimensions, which is used to emit the electromagnetic energy and capture the reflected energy. The imager renders an image of the target object using the measured intensity and phase of the reflected energy, wherein the image is rendered having a sub-wavelength resolution.

In another exemplary embodiment, a hand held scanning device for near-field imaging includes a housing, a probe device disposed in the housing, and a first semiconductor chip disposed in the housing. The probe device is adapted to scan a surface of a target object by emitting electromagnetic energy having a wavelength at a given operating frequency and by capturing reflected electromagnetic energy from the target object. The probe device includes at least one probe element. The first semiconductor chip includes an integrated circuit to generate the electromagnetic energy emitted by the probe device and to measure an intensity and phase of the reflected energy captured by the probe device. The probe device may be integrally formed on the first semiconductor chip or on a second semiconductor chip, which is separate from the first semiconductor chip. The probe element may comprise an array of probe elements, each having sub-wavelength dimensions.

In yet another exemplary embodiment of the invention, a near-field imaging method is provided. The method includes scanning a surface of a target object with electromagnetic energy having a wavelength at a given operating frequency; capturing reflected electromagnetic energy from the target object; measuring an intensity and phase of the reflected energy; and rendering an image of the target object using the measured intensity and phase of the reflected energy, wherein the scanning and capturing is performed using a probe having sub-wavelength dimensions, and wherein the image is rendered having a sub-wavelength resolution.

These and other exemplary embodiments of the invention will be described or become apparent from the following detailed description of exemplary embodiments, which is to be read in connection with the accompanying drawings.

BRIEF DESCRIPTION OF THE DRAWINGS

FIG. 14 is high-level diagram of a near-field millimeter wave imaging system according to an exemplary embodiment of the invention.

DETAILED DESCRIPTION OF EXEMPLARY EMBODIMENTS

Figure 1:
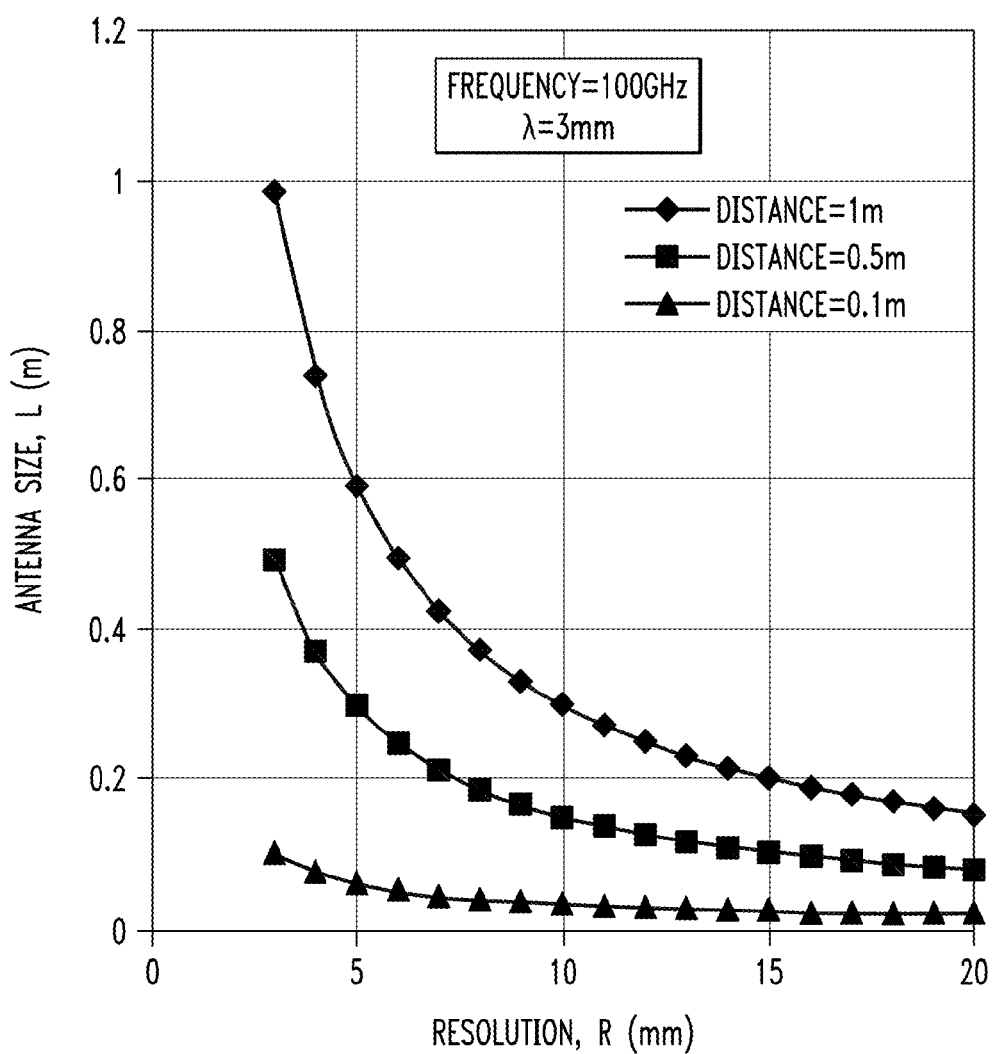
FIG. 1 graphically illustrates antenna size versus far-field spatial resolution for different antenna-object distances for a far field imaging system operating at a frequency of 100 GHz.

Exemplary embodiments of the invention will now be discussed in further detail with regard systems and method for near-field millimeter wave imaging and, in particular, near-field millimeter wave imaging systems and methods that enable sub-wavelength resolution imaging by scanning objects with sub-wavelength probe elements and capturing and measuring phase and intensity of reflected energy to generate images. In accordance with exemplary embodiments of the invention, near-field imaging systems can operate in the frequency range of about 65 GHz and higher (e.g., about 110 GHz or greater) while achieving sub-wavelength resolution that is orders of magnitude higher than the diffraction limit.

Far-Field Versus Near-Field

The resolution of a far-field antenna can be calculated from its directivity. The directivity of an antenna, $D_0$, is defined as "the ratio of the radiation intensity in a given direction from the antenna to the radiation intensity averaged over all directions. This quantity can be expressed in terms of the antenna beam-width as follows:

$$D_0 \sim 4\pi\theta^{-2} \quad (1)$$

where $\theta$ is the antenna beam-width in radians for a symmetric pattern. The directivity can also be calculated in terms of the antenna aperture size and the wave-length as follows:

$$D_0 = 4\pi A\lambda^{-2} \quad (2)$$

where A is the effective antenna aperture size and is the wavelength.

From equations (1) and (2), the antenna beam-width can be calculated as follows:

$$\theta \sim \lambda A^{-0.5} \quad (3)$$

and the spatial resolution, $R_{res}$, can be expressed as follows:

$$R_{res} = z\theta \sim z\lambda A^{-0.5} \quad (4)$$

where z is the distance from the antenna. For a square aperture, a more accurate expression for Rres can be calculated as follows:

$$R_{res} = z\theta \sim z\lambda\left(\frac{\pi^{0.5}}{1.8}\right)A^{-0.5} = z\lambda\left(\frac{\pi^{0.5}}{1.8}\right)a^{-1} \quad (5)$$

where a is the dimension of the square aperture.

FIG. 1 graphically illustrates antenna size versus far-field spatial resolution for different antenna-object distances for a far field imaging system operating at a frequency of 100 GHz. In particular FIG. 1 shows the diffraction limited resolution of a square antenna, $R_{res}$, versus antenna size, a, for three different antenna-object distances, z=0.1 m, z=0.5 m, and z=1 m, at 100 GHz ($\lambda$=3 mm). As FIG. 1 shows, to achieve an spatial resolution of 5 mm at 100 GHz, an antenna size of 0.6 m is required. This is primarily due to the diffraction limit of far-field imagers as expressed in Equation (5).

Unfortunately, the large size of the antenna is not the only problem in far-field imagining. In order to construct an image, the antenna beam must be steered in two dimensions. This can be done by either mechanical or electronic methods. Mechanical methods are very slow and can significantly increase the cost of the system. An electronic scheme can be implemented using a phase-array to control a plurality of antennas to steer the main antenna beam, but this electronic method requires a very large number of transmitters and receivers that operate in a coherent fashion.

In order to achieve a spatial resolution of 5 mm at 1 m distance for a 100 GHz operating frequency, with $\lambda/2$ spacing between two elements, the required number of elements in the array can be calculated as follows:

$$N = \left(\frac{2 \times 1 \text{ m}}{0.005 \text{ m}}\right)^2 = 160{,}000 \quad (6)$$

and the size of the antenna array would be:

$$D = N^{0.5} \times \frac{\lambda}{2} = 400 \times \frac{3 \text{ mm}}{2} = 0.6 \text{ m} \quad (7)$$

This large number of elements in a far-field based system significantly increases the cost of the whole system and makes it impractical for low-cost portable applications such as medical imaging.

Figure 2:
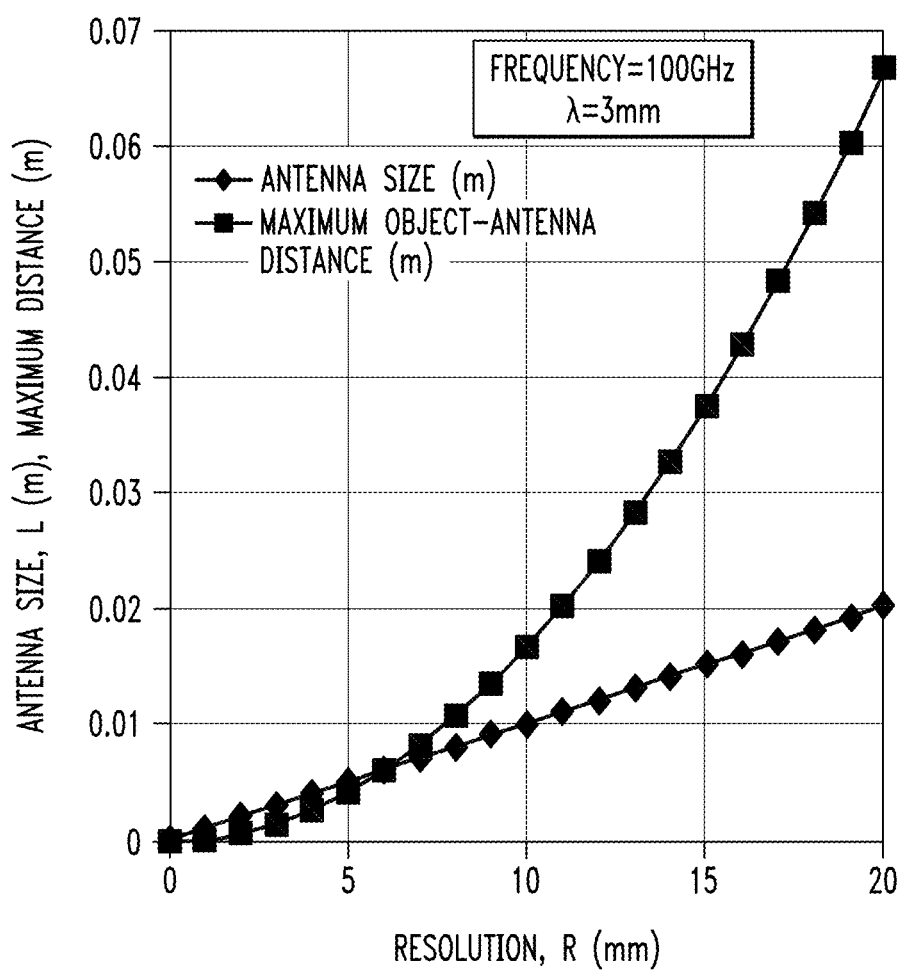
FIG. 2 graphically illustrates (i) antenna size versus near-field spatial resolution at a frequency of 100 GHz, and (ii) a maximum allowable antenna distance verses near-field spatial resolution for a near-field imaging system operating at a frequency of 100 GHz.

As compared to a far field imaging system as discussed above, the resolution in a near-field imaging system is not limited by the antenna size and the number of its elements. FIG. 2 graphically illustrates (i) antenna (probe) size (in meters) versus near-field spatial resolution (in mm) at a frequency of 100 GHz, and (ii) a maximum allowable antenna (probe) distance (in meters) versus the near-field spatial resolution for a near-field imaging system operating at a frequency of 100 GHz. As shown in FIG. 2, the resolution of a near-field imaging system is on the order of the probe (near-field antenna) size and can be enhanced by making the probe very small. As shown in FIG. 2, in order to achieve a resolution of 5 mm, a probe size of 5 mm or smaller is required. The antenna size, number of elements, and cost of a near-field imaging system is orders of magnitude smaller than that of a far-field system. The only limitation in a near-field imaging system is the distance of the object and the antenna. The maximum allowable distance of the object and an antenna in a near-field system can be estimated by the following equation:

$$MOAD = (\text{Maximum Object} - \text{Antenna Distance}) = \frac{2a^2}{\lambda} \quad (8)$$

where a is the longest dimension of the antenna and $\lambda$ is the wavelength. FIG. 2 further depicts the MOAD versus resolution at 100 GHz. To achieve a resolution of 0.5 mm at 100 GHz, a near-field probe size of ~0.5 mm and a MOAD of less than $$\frac{2 \times (0.5 \text{ mm})^2}{3 \text{ mm}} \sim 0.167 \text{ mm}$$

is desired.

Simulation Results

As discussed in further detail below, several computer simulations were performed to demonstrate that a near-field imaging system with a resolution of smaller than one wavelength can be achieved according to principles of the invention, and the computer simulation results were verified with measurements obtained via a physical experiment. FIGS. 3, 4A, 4B, 5A, 5B, 6A, 6B, 7A, 7B, 8A, 8B, 9A, and 9B demonstrate one computer simulation that was performed. In particular, FIG. 3 illustrates a computer model 100 of a near-field imaging system with a resolution of smaller than one wavelength, which was employed to obtain computer simulation results shown in FIGS. 4A, 4B, 5A, 5B, 6A, 6B, 7A, 7B, 8A, 8B, 9A, and 9B.

Figure 3:
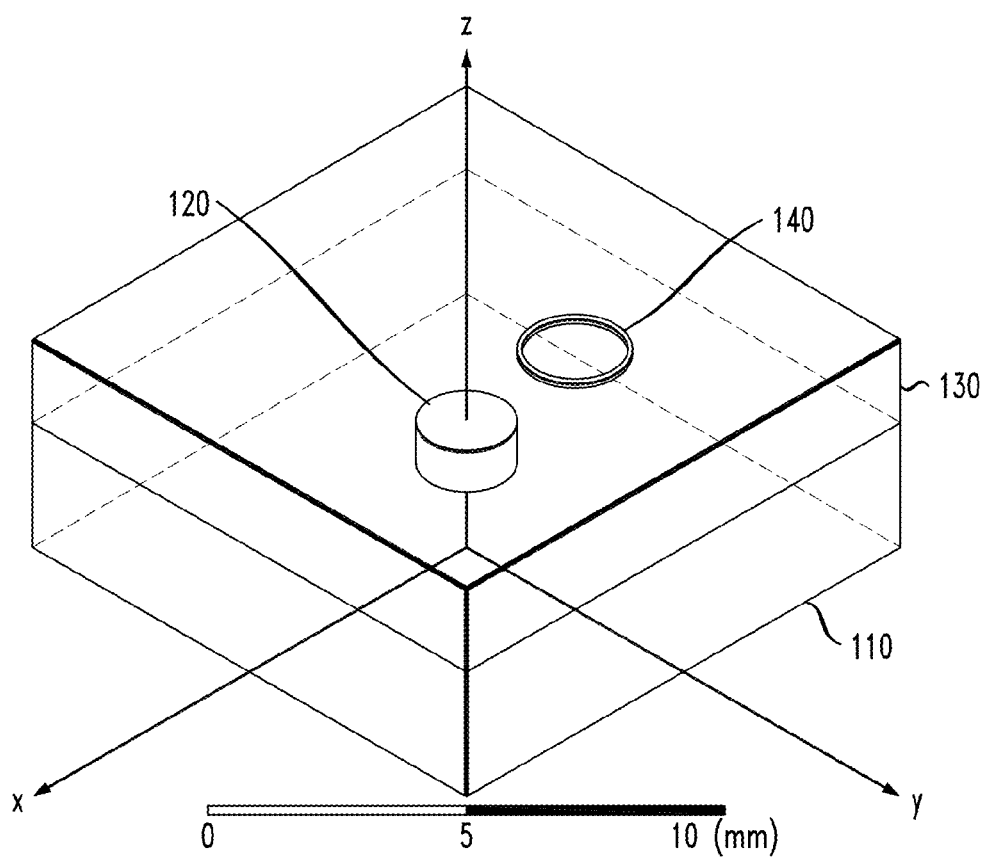
FIG. 3 shows a computer model used to simulate a near-field imaging system for scanning a target object, according to an exemplary embodiment of the invention.

More specifically, referring to FIG. 3, the computer model 100 comprises a substrate 110 having a cylindrical dielectric object 120 embedded in an upper surface of the substrate 110. The dielectric object 120 was defined to have a diameter of 2 mm, and the substrate 110 was defined to be a 10 mm×10 mm Teflon board with a dielectric constant, $\epsilon_r$=2.1. The upper surfaces of the dielectric object 120 and substrate 110 were located at the same Z-coordinate. The model 100 was further defined to include a layer of air 130 with a thickness of 100 um, and a loop-shaped probe 140 with a diameter of 2 mm, which was used to image the surface of the Teflon board 110 at a distance of 100 μm through the air medium 130. To construct simulated image, the loop-shaped probe 140 was used to image the cylindrical object 120 at a frequency of 100 GHz by moving the loop probe 140 along the X and Y directions and obtaining a reflection coefficient $S_{11}$ measurement at each x-y position of the loop probe 140, for each of three different dielectric constant values of the dielectric object 120 (i.e., $\epsilon_r$=2.1, 1.0 and 10).

Figure 4A:
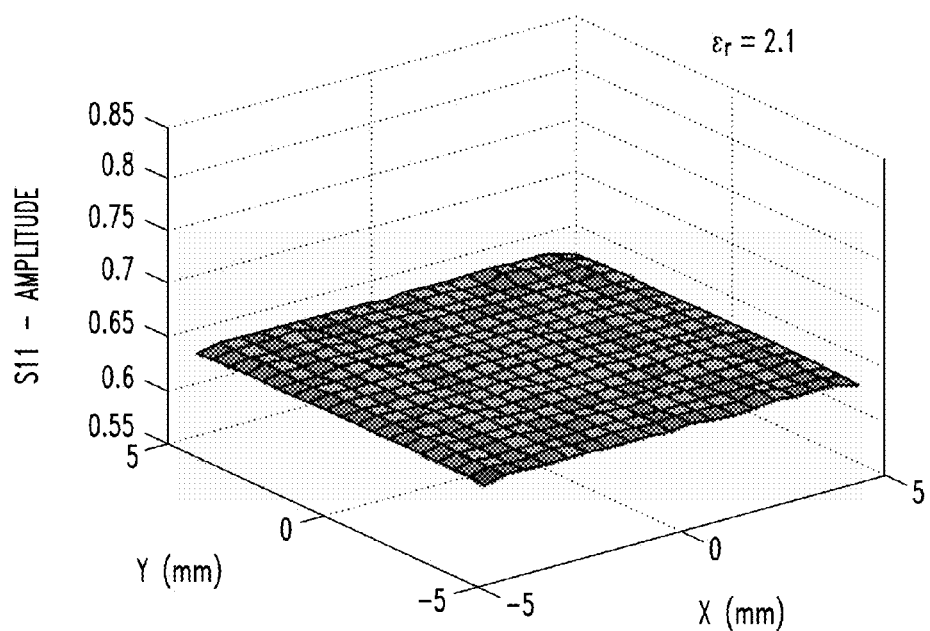
FIGS. 4A and 4B are three-dimensional (3D) and two-dimensional (2D) plots, respectively, of simulated $S_{11}$ amplitude data obtained based on the computer model FIG. 3 with target object having a dielectric constant $\in_r=2.1$.
Figure 4B:
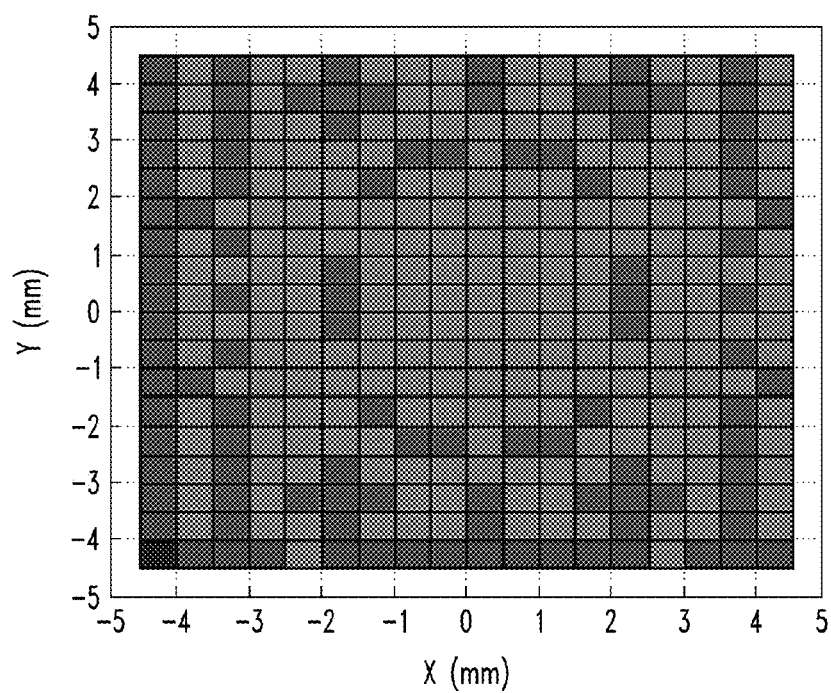
Figure 5A:
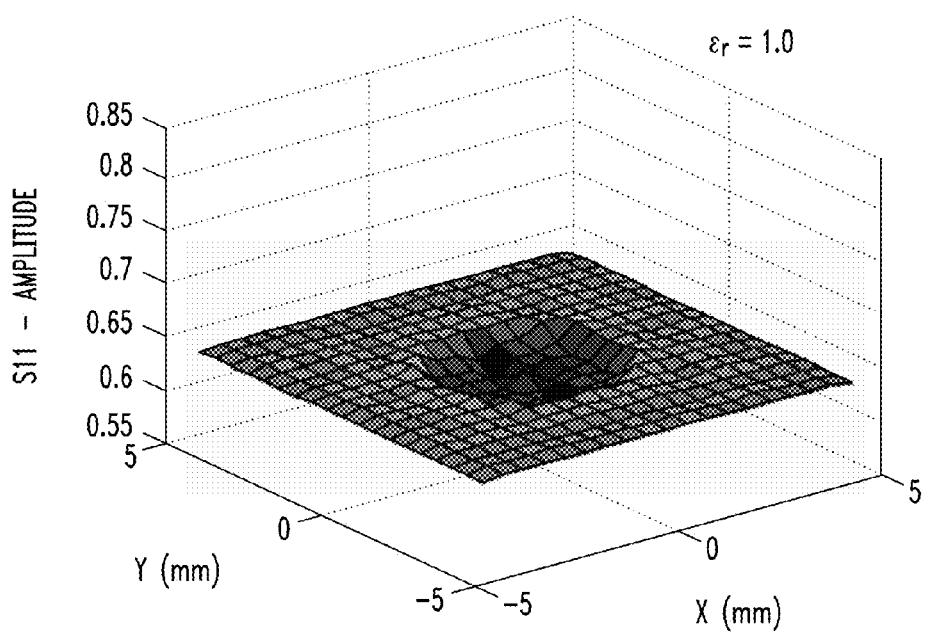
FIGS. 5A and 5B are 3D and 2D plots, respectively, of simulated $S_{11}$ amplitude data obtained based on the computer model of FIG. 3, with the target object having dielectric constant $\in_r=1.0$.
Figure 5B:
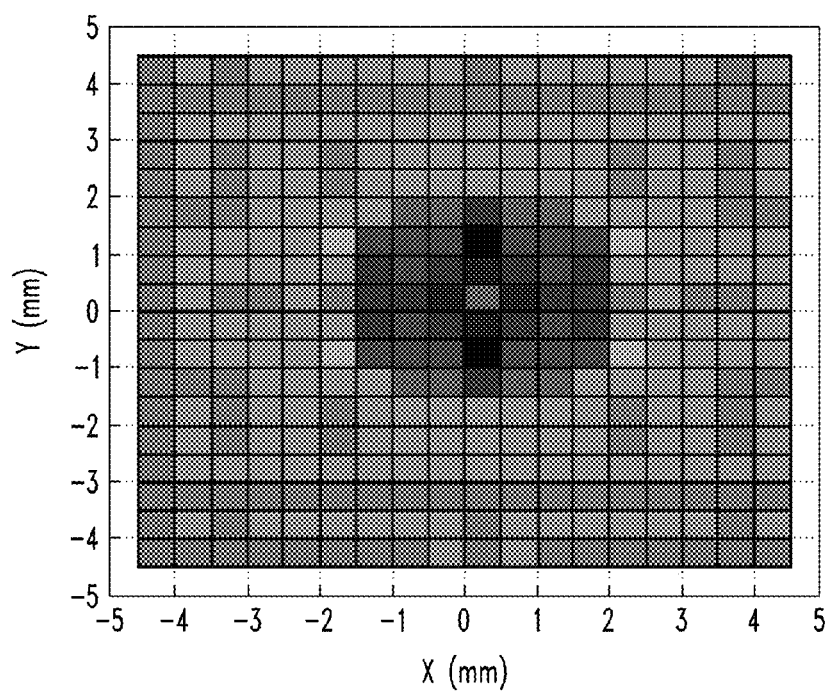
Figure 6A:
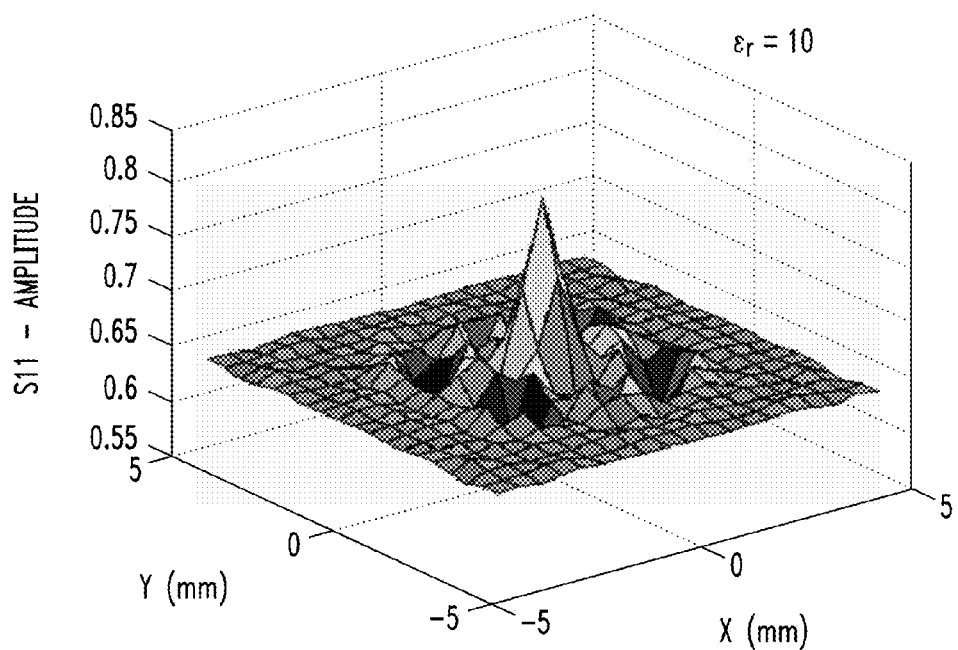
FIGS. 6A and 6B are 3D and 2D plots, respectively, of simulated $S_{11}$ amplitude data obtained based on the computer model of FIG. 3 with the target object having dielectric constant $\in_r=10.0$.
Figure 6B:
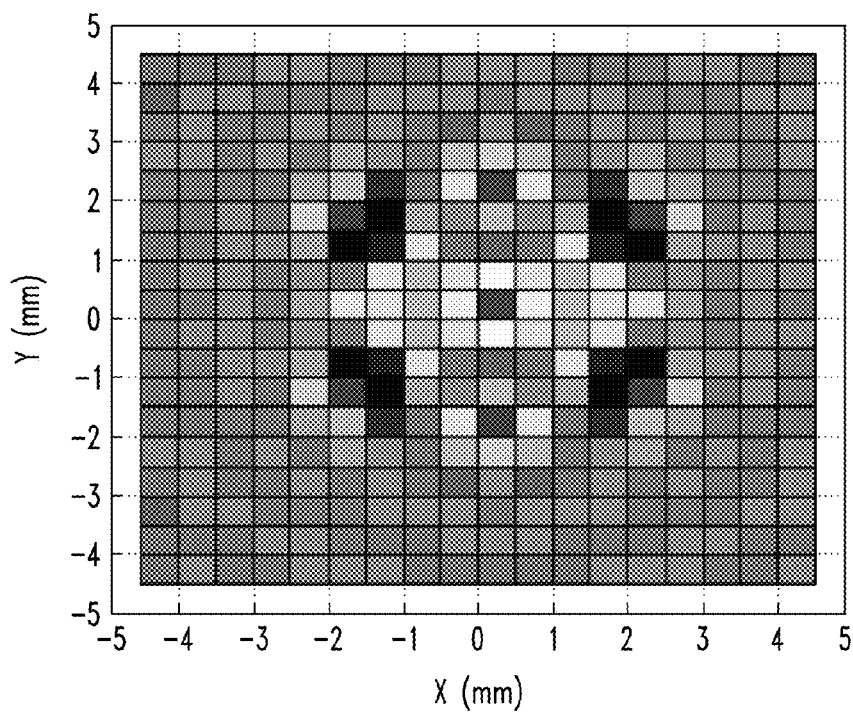

FIGS. 4A, 4B, 5A, 5B, 6A, and 6B illustrate simulation results of $S_{11}$ amplitude data (in a linear scale) obtained with the loop probe 140 at 100 GHz at different (x,y) positions for three different dielectric constant values of the dielectric object 120 (i.e., static relative permittivity $\epsilon_r$=2.1, 1.0 and 10). In particular, FIGS. 4A and 4B are three-dimensional (3D) and two-dimensional (2D) plots, respectively, of the simulated $S_{11}$ amplitude data obtained based on the computer model 100 of FIG. 3 with the dielectric object 120 having dielectric constant $\epsilon_r$=2.1. Moreover, FIGS. 5A and 5B are 3D and 2D plots, respectively, of the simulated $S_{11}$ amplitude data obtained based on the computer model 100 of FIG. 3 with the dielectric object 120 having dielectric constant $\epsilon_r$=1.0. Furthermore, FIGS. 6A and 6B are 3D and 2D plots, respectively, of the simulated $S_{11}$ amplitude data obtained based on the computer model 100 of FIG. 3 with the dielectric object 120 having dielectric constant $\epsilon_r$=10.0.

As shown in FIGS. 4A and 4B, the amplitude of $S_{11}$ does not vary over the surface of the substrate 110, because the dielectric constant of the cylindrical object 120 is equal to the dielectric constant of the Teflon substrate 110 ($\epsilon_r$=2.1). As shown in FIGS. 5A, 5B, 6A and 6B, a standing-wave-like pattern appears when dielectric constant of the cylindrical object 120 differs from that of the Teflon substrate 110. The darker shades of grey color in FIGS. 5A, 5B, 6A and 6B correspond to larger amplitudes of $S_{11}$. By increasing the difference between the dielectric constants of the Teflon substrate 110 and the cylindrical object 120, the variation of the amplitude of $S_{11}$ increases, as follows:

For $\epsilon_{object}$=1.0 and $\epsilon_{substrate}$=2.1:

$\epsilon_{object} - \epsilon_{substrate}$=1-2.1=1.1; and $|S_{11}|_{max}$=0.65, $|S_{11}|_{min}$=0.61 \quad (1)

For $\epsilon_{object}$=2.1 and $\epsilon_{substrate}$=2.1:

$\epsilon_{object} - \epsilon_{substrate}$=2.1-2.1=0; and $|S_{11}|_{max}$=0.64, $|S_{11}|_{min}$=0.63 (difference due to numerical error) \quad (2)

For $\epsilon_{object}$=10.0 and $\epsilon_{substrate}$=2.1:

$\epsilon_{object} - \epsilon_{substrate}$=10.0-2.1=7.9; and $|S_{11}|_{max}$=0.80, $|S_{11}|_{min}$=0.57 \quad (3)

Figure 7A:
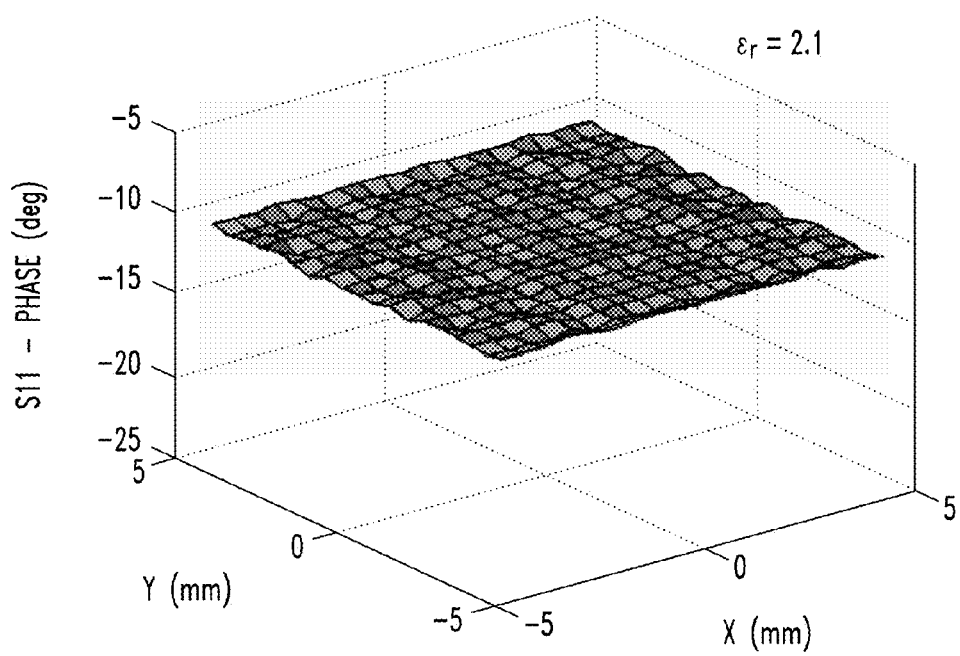
FIGS. 7A and 7B are 3D and 2D plots, respectively, of simulated $S_{11}$ phase data obtained based on the computer model of FIG. 3, with the target object having dielectric constant $\in_r=2.1$.
Figure 7B:
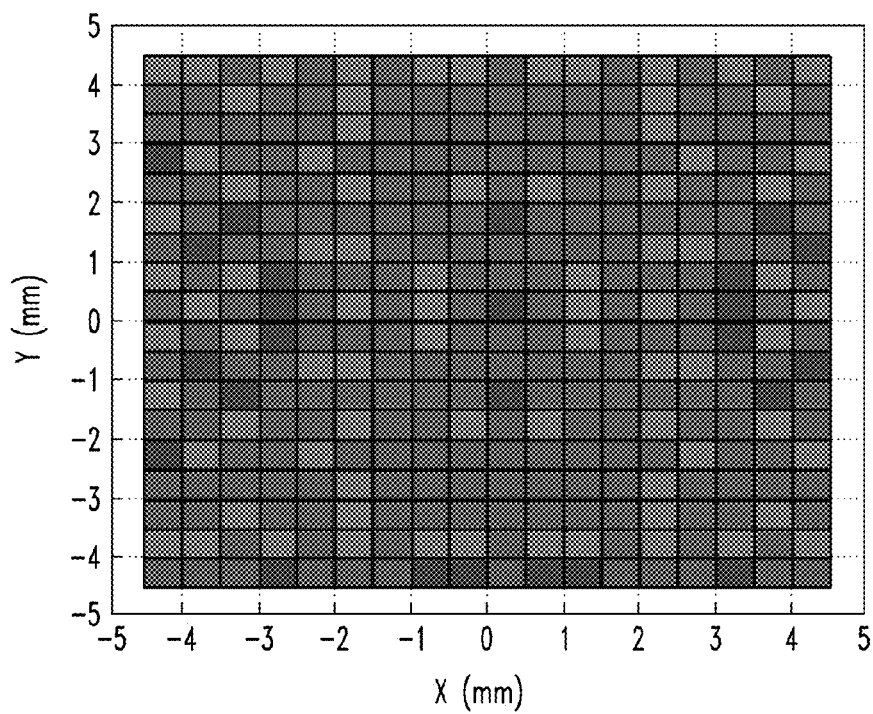
Figure 8A:
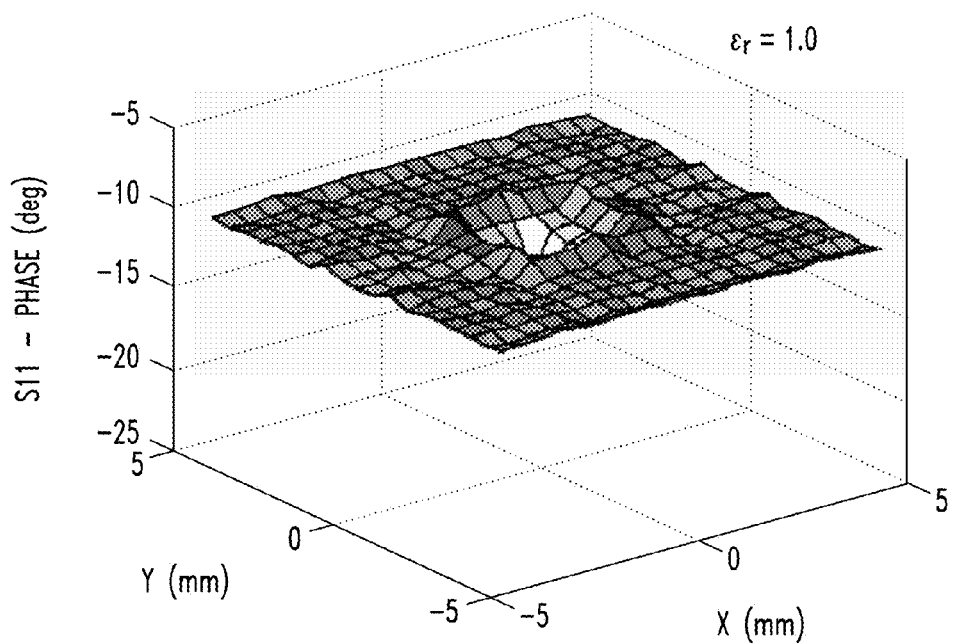
FIGS. 8A and 8B are 3D and 2D plots, respectively, of simulated $S_{11}$ phase data obtained based on the computer model of FIG. 3, with the target object having dielectric constant $\in_r=1.0$.
Figure 8B:
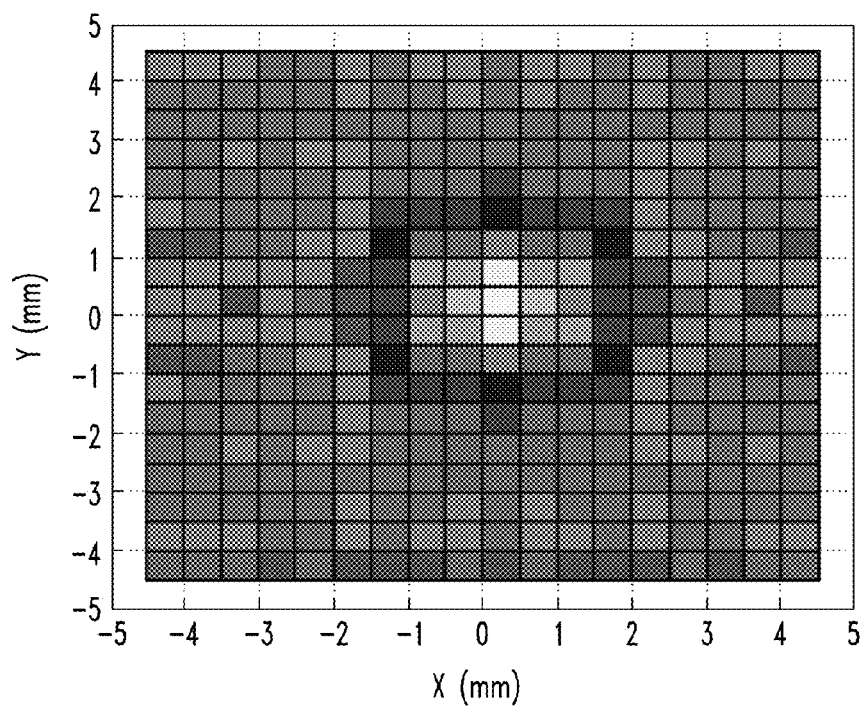
Figure 9A:
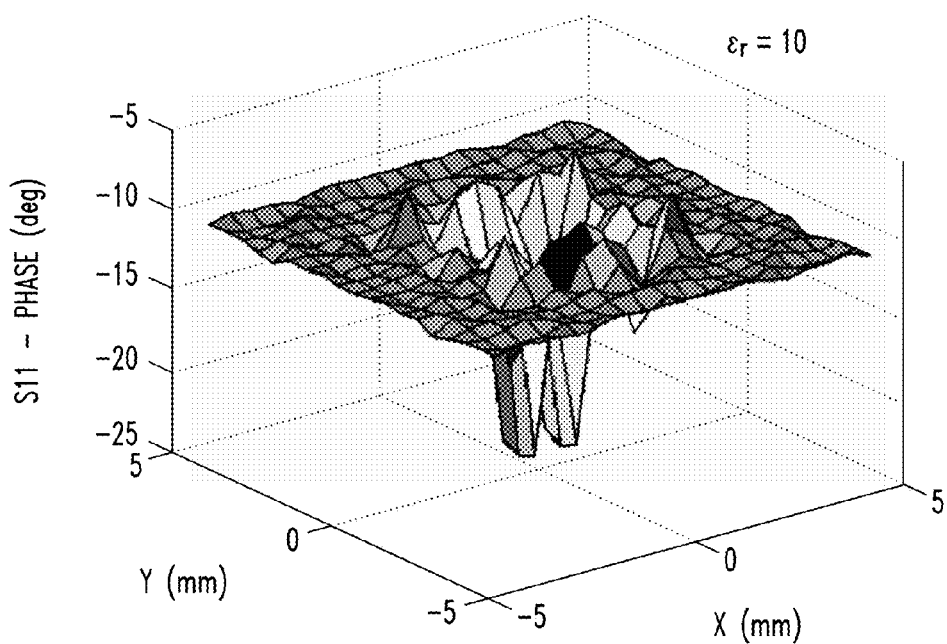
FIGS. 9A and 9B are 3D and 2D plots, respectively, of simulated $S_{11}$ phase data obtained based on the computer model of FIG. 3, with the target object having dielectric constant $\in_r=10.0$.
Figure 9B:
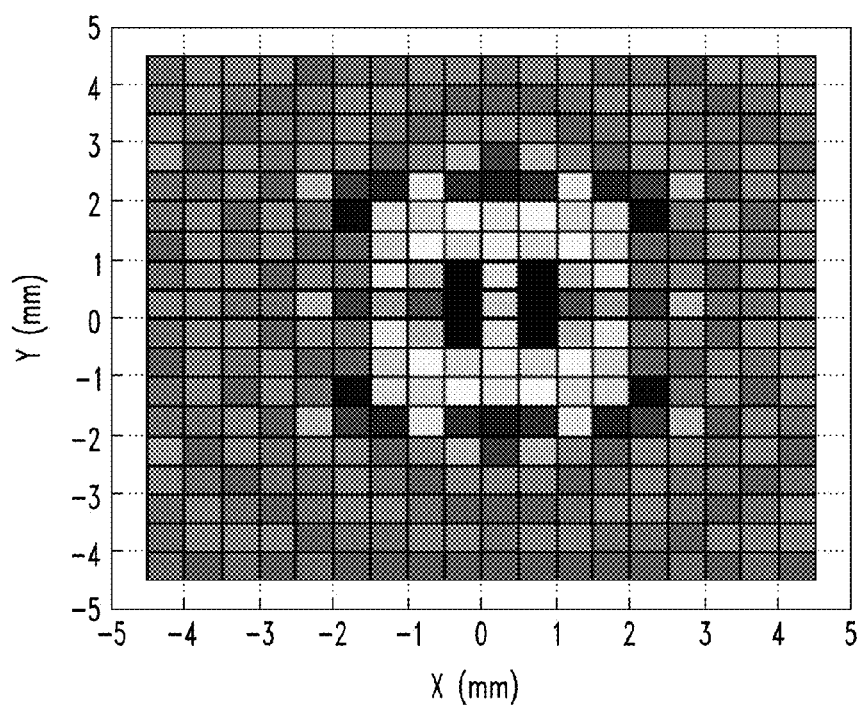

FIGS. 7A, 7B, 8A, 8B, 9A, and 9B illustrate simulation results of $S_{11}$ phase data (in a linear scale, in degrees) obtained at different (x,y) positions for three different dielectric constant values of the dielectric object 120 (i.e., $\epsilon_r$=2.1, 1.0 and 10). In particular, FIGS. 7A and 7B are 3D and 2D plots, respectively, of the simulated $S_{11}$ phase data obtained based on the computer model 100 of FIG. 3 with the dielectric object 120 having dielectric constant $\epsilon_r$=2.1. Moreover, FIGS. 8A and 8B are 3D and 2D plots, respectively, of the simulated Su phase data obtained based on the computer model 100 of FIG. 3 with the dielectric object 120 having dielectric constant $\epsilon_r$=1.0. Furthermore, FIGS. 9A and 9B are 3D and 2D plots, respectively, of the simulated $S_{11}$ phase data obtained based on the computer model 100 of FIG. 3 with the dielectric object 120 having dielectric constant $\epsilon_r$=10.0.

As shown in FIGS. 7A and 7B, the phase of $S_{11}$ does not vary over the surface of the substrate 110, because the dielectric constant of the cylindrical object 120 is equal to the dielectric constant of the Teflon substrate 110 ($\epsilon_r$=2.1). As shown in FIGS. 8A, 8B, 9A and 9B, the variation of the phase of $S_{11}$ increases by increasing the difference in the dielectric constants of the substrate 110 and the cylindrical object 120. The maximum and minimum values for the phase of $S_{11}$ are as follows:

For $\in_{object}$=1.0 and $\in_{substrate}$=2.1:

$\in_{object} - \in_{substrate} = 1 - 2.1 = -1.1$; and $(Phase(S_{11}))_{max} = -9.4, (Phase(S_{11}))_{min} = -13.8$ \hfill (1)

For $\in_{object}$=2.1 and $\in_{substrate}$=2.1:

$\in_{object} - \in_{substrate} = 2.1 - 2.1 = 0$; and $(Phase(S_{11}))_{max} = -10.4, (Phase(S_{11}))_{min} = -11.2$ (difference due to a numerical error). \hfill (2)

For $\in_{object}$=10.0 and $\in_{substrate}$=2.1:

$\in_{object} - \in_{substrate} = 10.0 - 2.1 = 7.9$; and $(Phase(S_{11}))_{max} = -7.8, (Phase(S_{11}))_{min} = -24.0$ \hfill (3)

Figure 10:
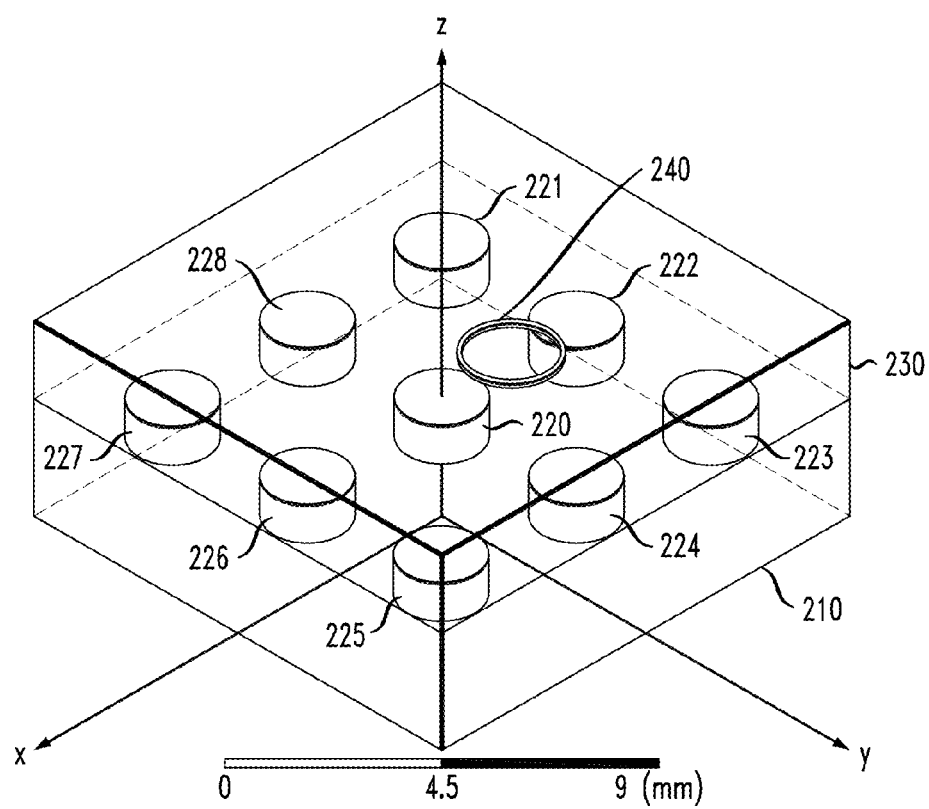
FIG. 10 shows a computer model used to simulate a near-field imaging system for scanning a target object, according to another exemplary embodiment of the invention.

To further demonstrate the imaging capability of a near-field probe, another computer simulation was performed using an exemplary computer model 200 as shown in FIG. 10. As shown in FIG. 10, the computer model 200 comprises a substrate 210 having nine cylindrical dielectric objects 220, 221, 222, 223, 224, 225, 226, 227, and 228 embedded in an upper surface of the substrate 210. The dielectric objects 220-228 were defined to have a diameter of 2 mm, and the substrate 210 was defined to be a 10 mm×10 mm Teflon substrate with a dielectric constant, $\in_r$=2.1. The upper surfaces of the dielectric objects 220-228 and substrate 210 were located at the same Z-coordinate. The model 200 was further defined to include a layer of air 230 with a thickness of 100 um, and a loop-shaped probe 240 with a diameter of 2 mm, which was used to image the surface of the Teflon substrate 210 at a distance (object-probe distance) of 100 μm through the air medium 230. Moreover, the distance between any two of the dielectric objects 220~228 was defined to be 2 mm.

To construct simulated images, the loop-shaped probe 140 was moved along the X and Y directions and at each x-y position of the loop probe 240, $S_{11}$ amplitude and phase measurements were obtained for each of three different dielectric constant values of the dielectric object 120 (i.e., $\in_r$=2.1, 1.0 and 10). Similar to the $S_{11}$ plots shown in FIGS. 4A, 4B, 5A, 5B, 6A and 6B, the simulation results for the model 200 of FIG. 10 revealed that each cylindrical object 220~228 causes a standing-wave-like pattern in the amplitude and phase of $S_{11}$. As will be explained below, this important characteristic of the near-field images can be used to derive the effective dielectric constant near the surface of the substrate. As shown below, this method can be used to construct a map of the dielectric constant for the substrate. (e.g., Teflon board).

Experimental Results

Figure 11:
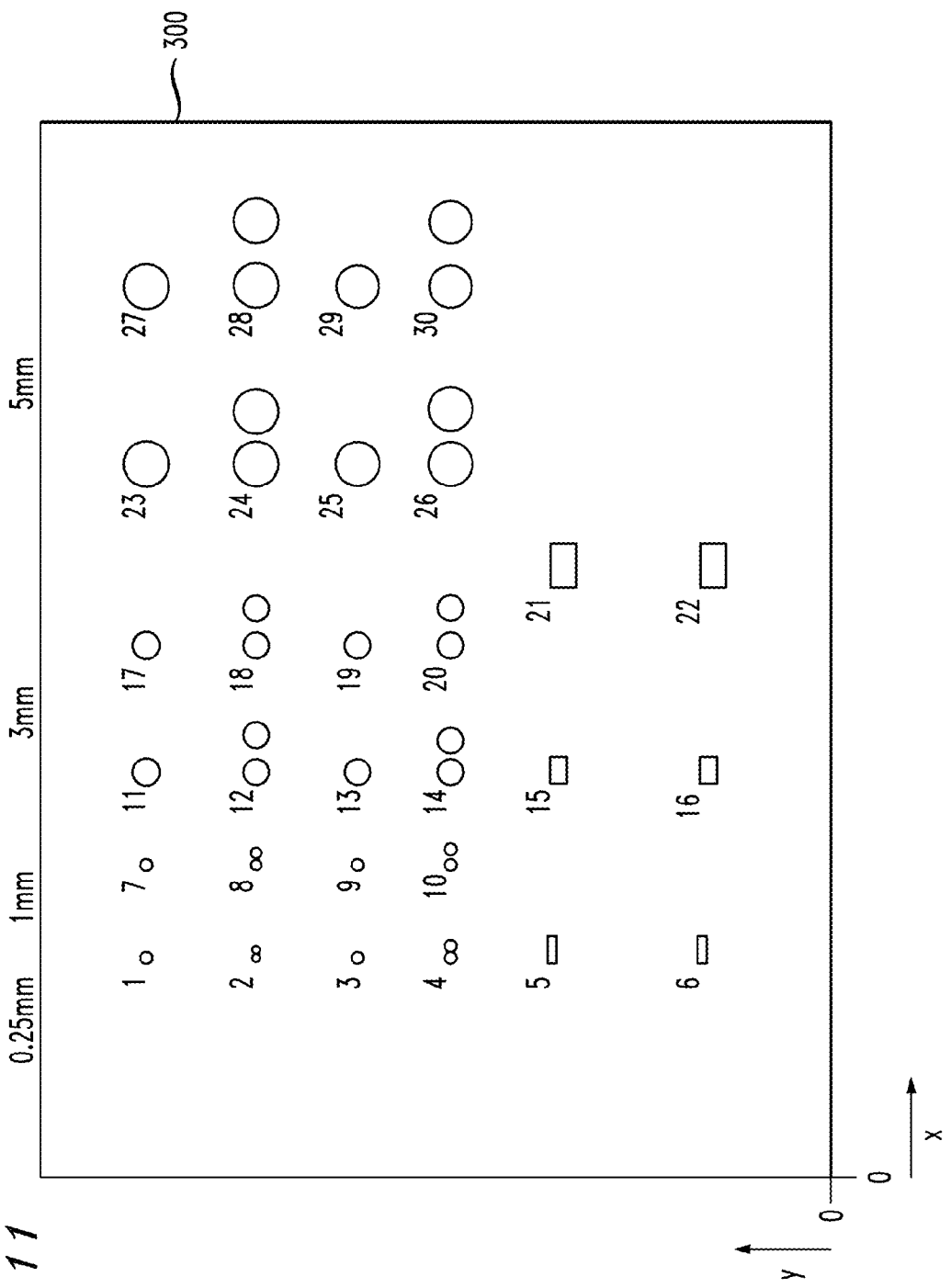
FIG. 11 schematically illustrates an experimental Teflon board that was constructed having various features of different sizes and dielectric constants formed in a surface thereof, which were scanned using a near-field imaging system according to an exemplary embodiment of the invention.

To verify the simulation results by actual experiment, a phantom made of a Teflon board mounted by different materials with dielectric constants ranging from 1 to 48 was built, and a near-field loop probe and a 110 GHz vector network analyzer were used to capture near-field images of the Teflon board. As shown below, the experimental results verify that it is feasible to achieve an image resolution of 0.5 mm at 100 GHz. FIG. 11 schematically illustrates an experimental Teflon board that was constructed having various features of different sizes and dielectric constants formed in a surface thereof, which were scanned using a near-field imaging system according to an exemplary embodiment of the invention. More specifically, in this experiment, a plurality of features 1-30 were formed in a Teflon board 300 by drilling holes to certain depths in the Teflon board 300 and filling the holes with materials having different dielectric constants. In particular, the following features were formed in the Teflon board 300 of FIG. 11:

Feature 1: circular hole with diameter d=1 mm, and dielectric constant $\in_r$=30;

Feature 2: two adjacent circular holes, each with a diameter d=1 mm, and dielectric constant $\in_r$=30;

Feature 3: circular hole with diameter d=1 mm, and dielectric constant $\in_r$=48;

Feature 4: two adjacent circular holes, each with a diameter d=1 mm, and dielectric constant $\in_r$=8;

Feature 5: rectangular hole with l (length)×w (width) dimensions=3 mm×1 mm, and dielectric constant $\in_r$=6;

Feature 6: rectangular hole with l×w dimensions=3 mm×1 mm, and dielectric constant $\in_r$=3;

Feature 7: circular hole with diameter d=1 mm, and dielectric constant $\in_r$=6;

Feature 8: two adjacent circular holes, each with a diameter d=1 mm, and dielectric constant $\in_r$=1;

Feature 9: circular hole with diameter d=1 mm, and dielectric constant $\in_r$=1;

Feature 10: two adjacent circular holes, each with a diameter d=1 mm, and dielectric constant $\in_r$=6;

Feature 11: circular hole with diameter d=3 mm, and dielectric constant $E_r$=3;

Feature 12: two adjacent circular holes, each with a diameter d=3 mm, and dielectric constant $\in_r$=6;

Feature 13: circular hole with diameter d=3 mm, and dielectric constant $E_r$=6;

Feature 14: two adjacent circular holes, each with a diameter d=3 mm, and dielectric constant $\in_r$=30;

Feature 15: rectangular hole with l (length)×w (width) dimensions=2 mm×3 mm, and dielectric constant $\in_r$=48;

Feature 16: rectangular hole with l×w dimensions=2 mm×3 mm, and dielectric constant $\in_r$=30;

Feature 17: circular hole with diameter d=3 mm, and dielectric constant $\in_r$=6;

Feature 18: two adjacent circular holes, each with a diameter d=3 mm, and dielectric constant $\in_r$=8;

Feature 19: circular hole with diameter d=3 mm, and dielectric constant $\in_r$=8;

Feature 20: two adjacent circular holes, each with a diameter d=3 mm, and dielectric constant $\in_r$=3;

Feature 21: rectangular hole with l (length)×w (width) dimensions=5 mm×3 mm, and dielectric constant $\in_r$=8;

Feature 22: rectangular hole with l×w dimensions=5 mm×3 mm, and dielectric constant $\in_r$=1;

Feature 23: circular hole with diameter d=5 mm, and dielectric constant $\in_r$=3;

Feature 24: two adjacent circular holes, each with a diameter d=5 mm, and dielectric constant $\in_r$=3;

Feature 25: circular hole with diameter d=5 mm, and dielectric constant $\in_r$=30;

Feature 26: two adjacent circular holes, each with a diameter d=5 mm, and dielectric constant $\in_r$=8;

Feature 27: circular hole with diameter d=5 mm, and dielectric constant $\in_r$=1;

Feature 28: two adjacent circular holes, each with a diameter d=5 mm, and dielectric constant $\in_r$=1;

Feature 29: circular hole with diameter d=5 mm, and dielectric constant $\in_r$=48; and Feature 30: two adjacent circular holes, each with a diameter d=5 mm, and dielectric constant $\in_r$=6.

To generate an image of the experimental Teflon board 200, a near-field mm-wave imaging system was created using a hand-made loop probe and a 110 GHz vector network analyzer. The hand-made loop probe was connected to a 110 GHz vector network analyzer using a 1 mm coaxial cable. The vector network analyzer was used to measure the un-calibrated reflection coefficient $S_{11}$, between 65 GHz and 110 GHz with linear steps of 250 MHz To increase the accuracy of the measurement, the loop probe was fixed and the Teflon board was moved in X and Y directions so as to ensure that the distance between the Teflon board and the loop probe remained fixed and thereby prevent any error from being introduced in the experiment. In this measurement, the distance between the loop probe and the Teflon board was fixed at about 80 μm.

Figure 12A:
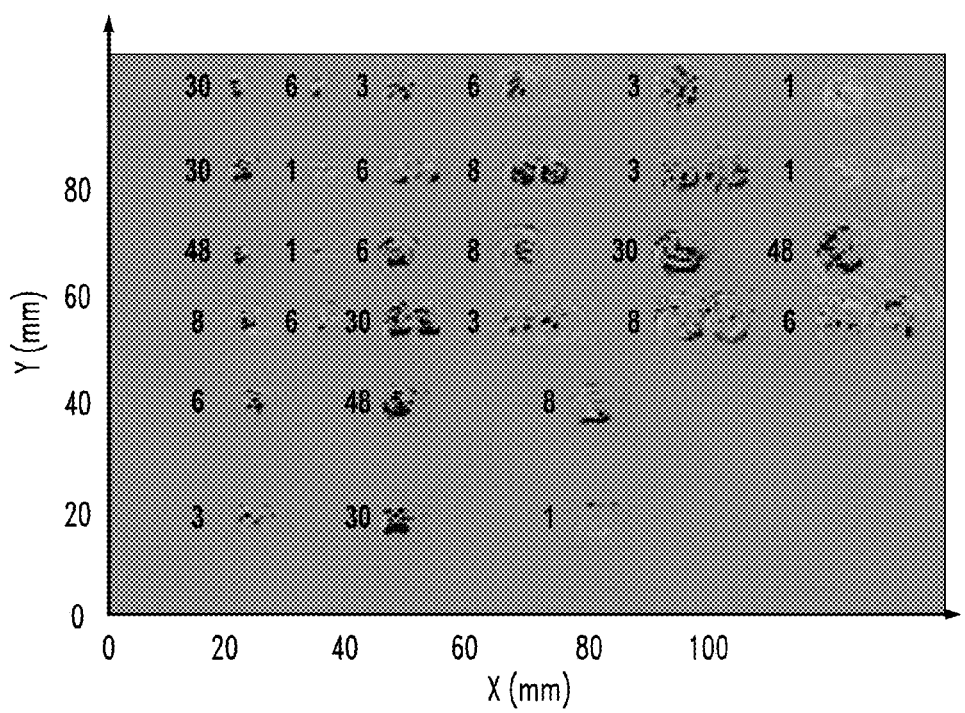
FIGS. 12A and 12B show experimental measurements of raw $S_{11}$ amplitude and phase data obtained by imaging the various features formed in the experimental Teflon board of FIG. 11.
Figure 12B:
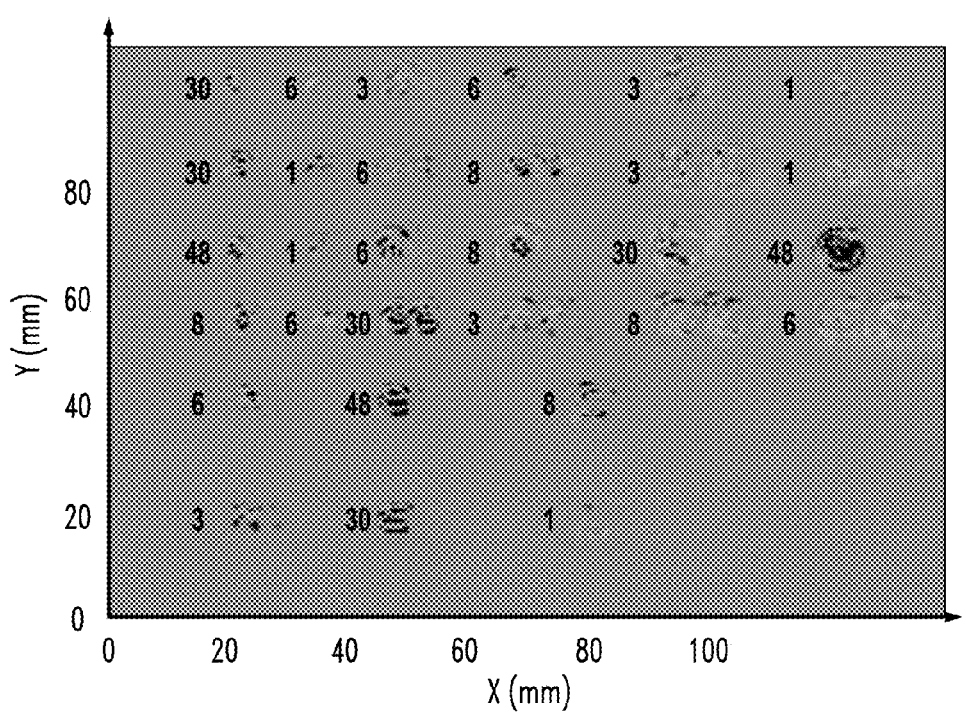

FIGS. 12A and 12B show the experimental measurements of the raw $S_{11}$ amplitude and phase data that was obtained by imaging the various features formed in the experimental Teflon board 300 of FIG. 11. In particular, FIG. 12A shows the amplitude of raw $S_{11}$ measurements in different (x,y) locations across the experimental Teflon board 300 of FIG. 11. In FIG. 12A, as the amplitude of $S_{11}$ increases, the shading changes from lighter to darker. Similar to the computer simulation results discussed above, the difference in the dielectric constants of the various features (dielectric filled holes) and the Teflon board (background material) generates a standing-wave-like pattern such that the amplitude of the wave depends on the dielectric constant of the material used for the feature. By increasing the dielectric constant of the material used in the features, the amplitude of the wave increases.

Furthermore, FIG. 12B shows the phase of raw $S_{11}$ measurements in different (x,y) locations across the experimental Teflon board 300 of FIG. 11. Similar to the $S_{11}$ amplitude image of FIG. 12A, the amplitude of the standing-wave-like pattern in the phase image of FIG. 12B increases by increasing the dielectric constant of the material used in a given feature. In accordance with principles of the invention, this unique characteristic of the near-field images can be used to estimate the dielectric constant of the material in a given feature. In particular, dielectric constant images can be generated using the following computations:

$$f_{amp}(x_0,y_0)=\text{var}\{\text{amp}(S_{11}(x,y))|(\text{dist}(x,x_0)<d) \text{ and } (\text{dist}(y,y_0)<d)\} \quad (9)$$

$$f_{phase}(x_0,y_0)=\text{var}\{\text{phase}(S_{11}(x,y))|(\text{dist}(x,x_0)<d) \text{ and } (\text{dist}(y,y_0)<d)\} \quad (10)$$

where (x,y) is the coordinate of the image pixel, $f_{amp}$ is a function derived from the amplitude of $S_{11}$, $f_{phase}$ is a function derived from the phase of $S_{11}$, var represents the variance function taken over points (x,y) such that the distance of x and $x_0$ is less than d and the distance of y and $y_0$ is less than d as well.

Figure 13A:
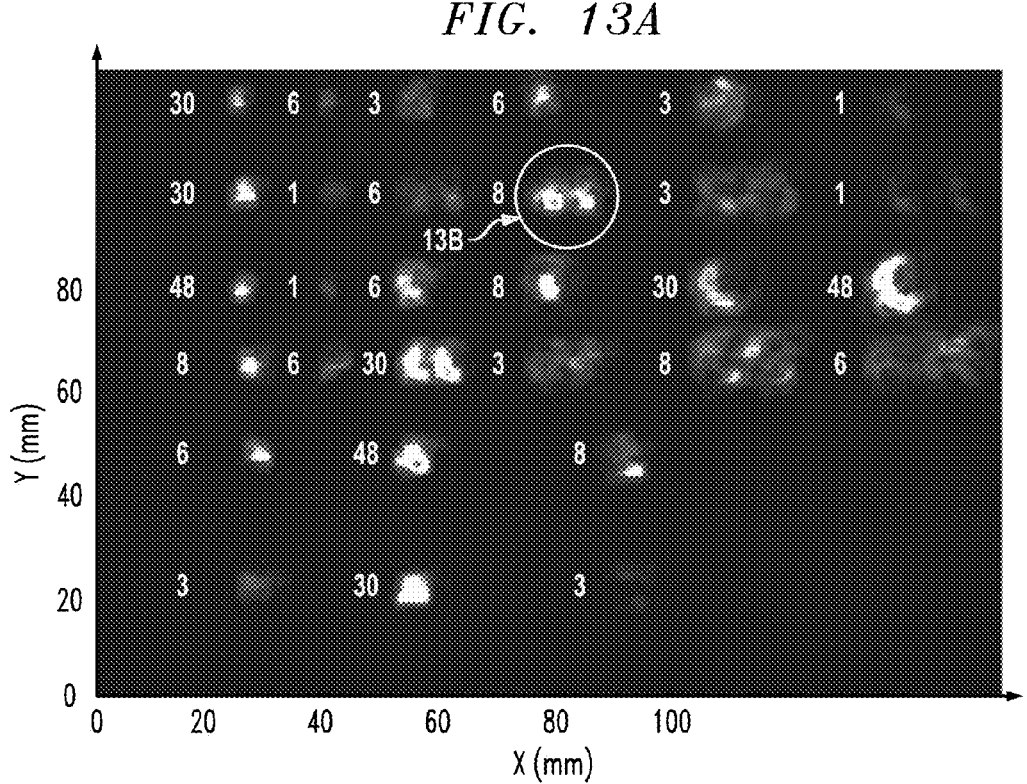
FIG. 13A shows an image generated by processing the raw $S_{11}$ amplitude data of FIG. 12A.
Figure 13B:
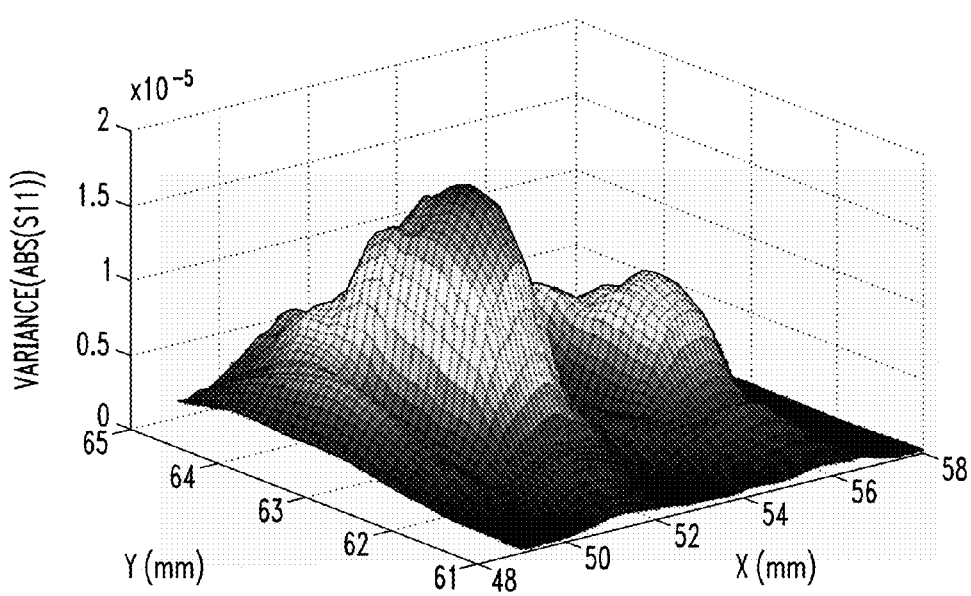
FIG. 13B is an exploded view of a portion of the image of FIG. 13A.
Figure 13C:
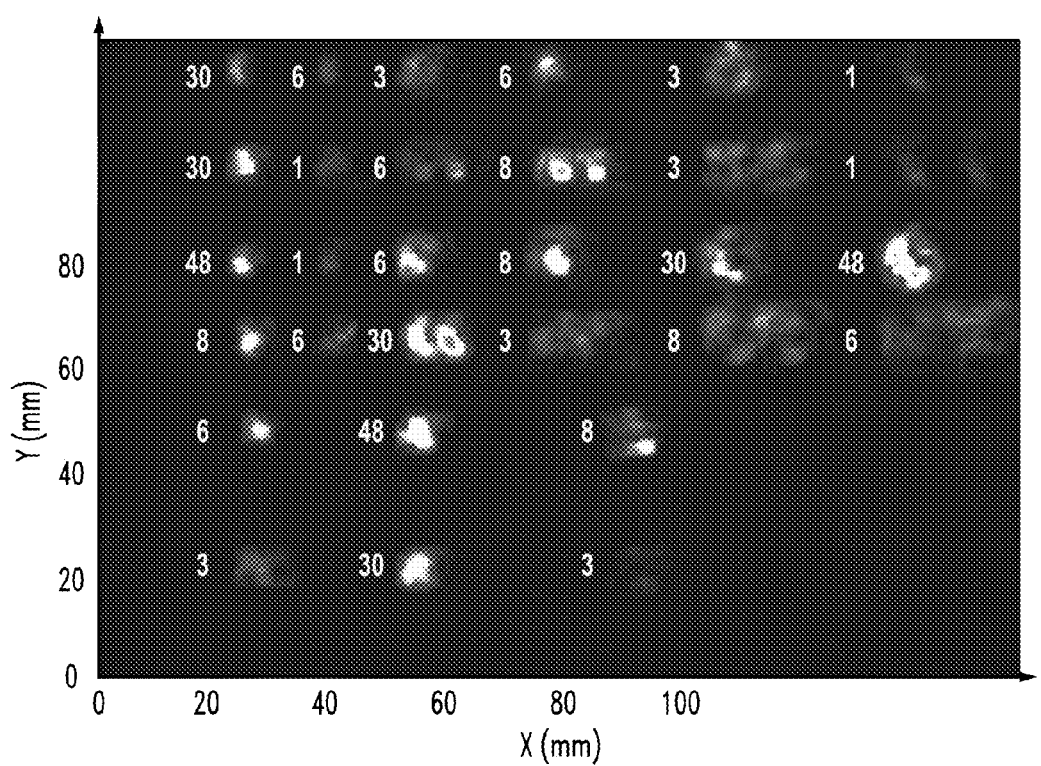
FIG. 13C shows an image generated by processing the raw $S_{11}$ phase data of FIG. 12B.

FIGS. 13A and 13B show images that were generated using the function defined in Equation (9), and FIG. 13C shows an image that was generated by the function defined in equation (10). In particular, FIG. 13A shows an image that was generated by processing the raw $S_{11}$ amplitude data of FIG. 12A using Equation (9), wherein a block of 16×16 pixels was used to calculate the variance at each point $f$amp(x,y). Moreover, FIG. 13C shows an image that was generated by processing the raw $S_{11}$ phase data of FIG. 12B using Equation (10), wherein a block of 16×16 pixels was used to calculate the variance at each point, $f$phase(x,y).

FIGS. 13A and 13C demonstrate that a dielectric map of an object can be generated by plotting the variance of the amplitude or phase of $S_{11}$ data that is obtained using a near-field probe to capture the $S_{11}$ data. The images in FIGS. 13A and 13B show the various features 1-30 of FIG. 11, with the dielectric constants 1, 3, 6, 8, 30, or 48 of each feature shown on the images. Based on the images shown in FIGS. 13A and 13C, as the dielectric constant of the surface increases near a given feature. The image color becomes darker (as compared to the color of the surrounding Teflon board material).

In order to examine the resolution of these images two zoomed picture are shown in FIGS. 20 and 21. Based on these Figures, a resolution of better than 0.5 mm is achieved at 110 GHz (λ=2.7 mm). To the best of our knowledge, among the millimeter wave imaging systems that operate in the frequencies of less than 110 GHz, this is the highest resolution that is reported.

FIG. 14 is high-level diagram of a near-field millimeter wave imaging system according to an exemplary embodiment of the invention. In general, FIG. 14 shows a near-field millimeter wave imaging system 400 comprising a hand-held scanning device 410, and imaging system 420 and a display 430. The hand-held scanning device 410 comprises a first chip 412 having an array of probes formed on a surface thereof and a second chip 414 (CMOS processing chip) having various type of integrated circuits for performing signal processing functions. The scanning device 410 is coupled to an imaging system 420 using a suitable wired connection 416 (or other suitable connections, such as wireless). A display system 430 is connected to the imaging system 420.

The scanning device 410 generally operates by scanning the surface of an object under test with the scanning device 410 by emitting an electromagnetic energy at a given operating millimeter or Terahertz frequency (e.g., 100 GHz) and measuring the intensity and phase of the reflected energy (i.e., $S_{11}$ amplitude and $S_{11}$ phase). The probe array chip 412 may be a semiconductor chip comprising an array of probes formed on one surface thereof (e.g., an array of small loop probes). For example, the probe array chip 412 may comprise an array of loop-shaped probes each with a diameter of 2 mm, or other types of probes with sub wavelength dimensions (e.g., ⅛ dipole antenna-type probe), with an array size of 1 inch×1 inch or 2 inches×2 inches, for example. In other embodiments of the invention, the probe array 412 may comprise a single probe element (e.g., one loop-shaped probe). However, a probe device formed with a plurality (array) of probe elements is preferred to achieve faster and efficient measurements.

Indeed, with a single probe, the scanning device 410 would have to be manually moved (manually scanning) over the surface of the object under test to collect the $S_{11}$ data at various points over the desired surface region of the object. With an array of probes, the scanning device 410 could be manually manipulated to position the probe array chip 412 over some desired surface region of the object under test, and the surface of the object can be electronically scanned (as opposed to manually scanned) by activating each probe element in sequence, or all at same time, and measuring the response of each probe element. In this manner, depending on the size of the probe array a relatively large surface area, e.g., few inches square, can be scanned at one time without having to manually move the scanning device 410. The probe array chip 412 can be packaged within a housing of the scanning device 410 such that the active surface of the probe array chip 412 can be brought into close contact with the surface of an object under test, with the surface of the object being separated from the active surface of the probe array chip by only the packaging material of the probe array chip 412.

As noted above, the CMOS processing chip 414 comprise various type of integrated circuits for performing signal processing functions. The circuits generally include, emitters for generating the electromagnetic signals that are sent to the probe array chip 412 and emitted by each of the one or more probe elements on the probe chip 412, receivers for receiving the reflected electromagnetic energy captured by the probe elements on the probe chip 412 and transmitted to the processing chip 414, and other suitable circuits that are commonly used for implementing vector network analyzer processing functions to generate $S_{11}$ data from the amplitude and phase of the reflected electromagnetic energy captured by the probe array chip 412. Although the probe array chip 412 and CMOS processing chip 414 are depicted as two separate chips, the probe array and processing circuits may be implemented on one chip, or the processing functions can be implemented on two or more separate chips.

Figure 16:
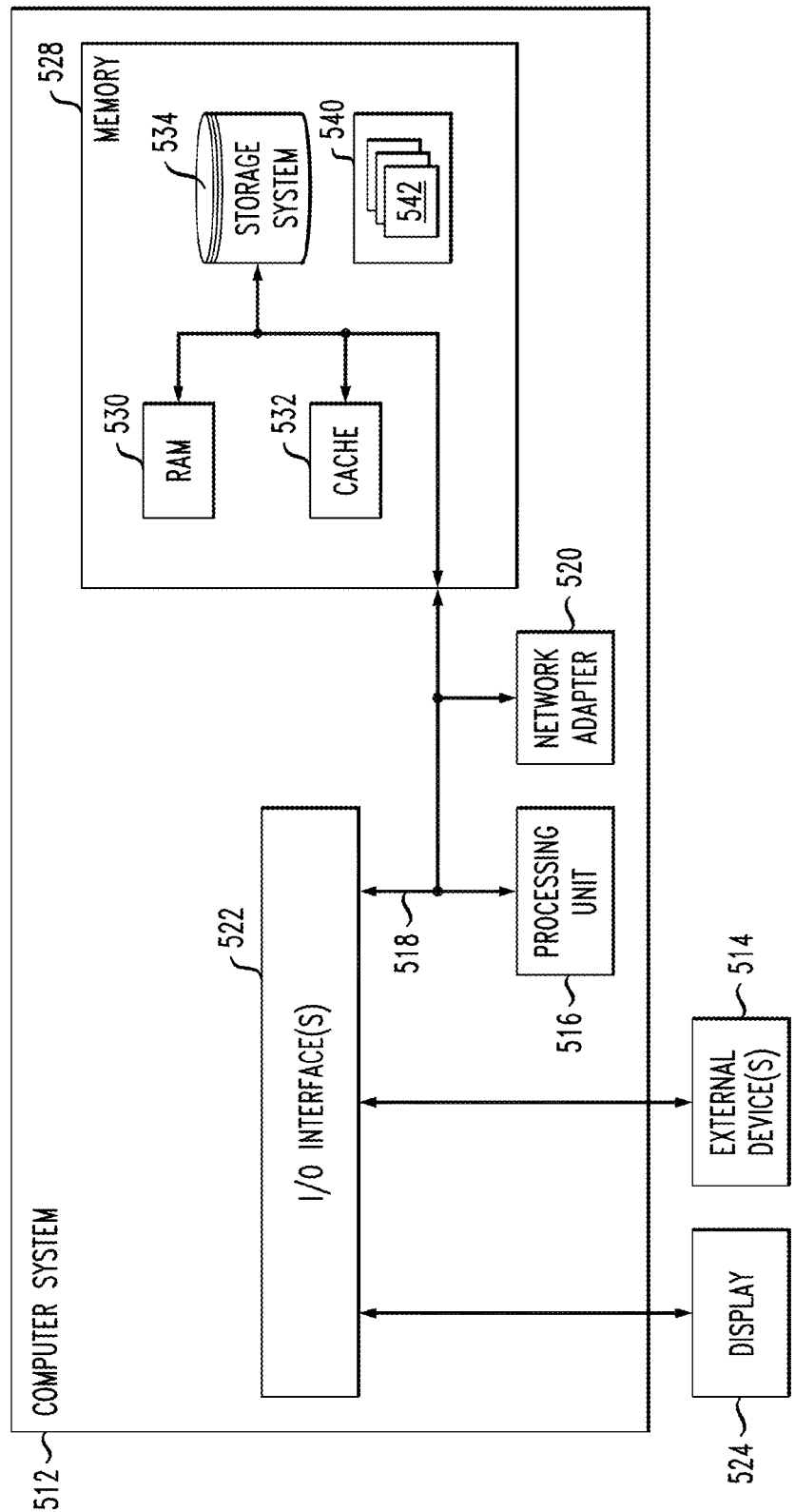
FIG. 16 illustrates a computer system in accordance with which one or more components/steps of the techniques of the invention may be implemented, according to an embodiment of the invention.

The imaging system 420 receives the $S_{11}$ data from the scanning device 410 over the connection 416 and processes the $S_{11}$ data to render and display an image of the scanned object on the display 430. For example, in accordance with principles of the invention, the $S_{11}$ data collected for the near-field energy of the probe array chip 410 can be used to estimate the dielectric constant of the material in a given feature and render images based on the estimated differenced in dielectric constant of the components of a scanned object based on Equations (9) and (10) above. The imaging system 420 can be any software and/or hardware system that can process the $S_{11}$ data and render images. For example, as discussed below, FIG. 16 illustrates a system/apparatus that may be used to implement the imaging system 420 of FIG. 14. In other embodiments, some of the processing functions of the chip 414 as discussed above may be implemented by the imaging system 420, and vice versa.

Figure 15:
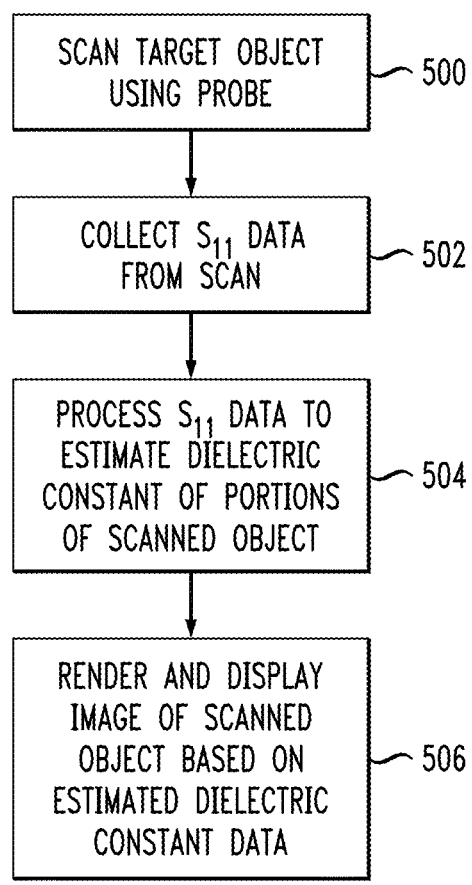
FIG. 15 is flow diagram of a method for performing near-field millimeter wave imaging according to an exemplary embodiment of the invention.

FIG. 15 is flow diagram of a method for performing near-field millimeter wave imaging according to an exemplary embodiment of the invention. In particular, FIG. 15 illustrates an exemplary mode of operation of the system 400 of FIG. 14. An initial step comprises scanning a target object using a near-field probe device (step 500). The scanning process involves emitting electromagnetic energy from one or more probe elements to a surface region of the target object, and then capturing electromagnetic energy reflected from the target object using the one or more probe elements. The reflected electromagnetic energy from the scan is then processed using vector network analyzing functions to generate and collect a set of $S_{11}$ data from the scan (step 502). These steps (500) and (502) may be performed by the scanning device 410 shown in FIG. 14.

The $S_{11}$ data is then processed to estimate the dielectric constants of the different surface components of the scanned object (step 504). An image is then rendered and displayed of the scanned object based on the estimated dielectric constant data (step 506). These steps (504) and (506) may be implemented by the imaging system 420 shown in FIG. 14. The image rendering methods can be implemented using known image processing techniques wherein the rendered images can be displayed in color or grayscale wherein different colors or different shades of gray provide information regarding the differences in dielectric constants of the materials contained in the scanned surface of the target object.

The imaging system and methods discussed above can be utilized in various fields, such as medical imaging for diagnostic purposes (detecting cancerous skin tissue), checking the quality of adhesive used in pharmaceutical tablets, paint used on cars, etc. As noted above, a near-field millimeter wave imaging system as discussed herein can achieve spatial resolution of 0.5 mm at 110 GHz. Moreover, a near-field millimeter wave imaging system according to principles of the invention can be fabricated at low cost. Indeed, as discussed above with reference to FIG. 14, a scanning probe can be implemented with chips that are fabricated using a commercial CMOS process. In short, a near-field mm-wave imaging system according to the invention can be fabricated at costs that are orders of magnitude cheaper than commercially available far-field based systems, while providing superior resolution compared to far-field based systems.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 14 and 15 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

One or more embodiments can make use of software running on a general-purpose computer or workstation. With reference to FIG. 16, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 30 and/or cache memory 532. The computer system/server 512 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 440, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. An imaging method, comprising:
    scanning a surface of a target object with electromagnetic energy having a wavelength at a given operating frequency;
    capturing reflected electromagnetic energy from the target object;
    measuring an intensity and phase of the reflected energy; and
    rendering an image of the target object using the measured intensity and phase of the reflected energy, wherein rendering an image of the target object comprises:
        using the measured intensity and phase of the reflected energy to estimate a dielectric constant of constituent elements of the scanned target object, wherein the dielectric constant is estimated based on a function of a variance of the measured intensity of the reflected energy over a set of points of the target object, and a function of a variance of the measured phase of the reflected energy over the set of points,
        estimating differences in dielectric constant of constituent elements a of the scanned target object, and
        rendering the image based on the estimated differences in dielectric constant of the constituent elements of the scanned object,
    wherein the scanning and capturing is performed using a probe having sub-wavelength dimensions, and wherein the measuring and rendering is performed using a computer processor, and
    wherein the image is rendered having a sub-wavelength resolution.

2. The method of claim 1, wherein the probe comprises an array of probe elements.

3. The method of claim 2, wherein the probe elements are loop-shape elements.

4. The method of claim 3, wherein the loop-Shaped elements each have a diameter of about 2 mm or less.

5. The method of claim 1, wherein the measured intensity and phase of the reflected energy are $S_{11}$ parameters.

6. The method of claim 5, wherein rendering the image comprises computing pixel values of the image as;

$$f_{amp}(x_0,y_0)=\text{var}\{\text{amp}(S_{11}(x,y))|(\text{dist}(x,x_0)<d) \text{ and } (\text{dist}(y,y_0)<d)\}$$

$$f_{phase}(x_0,y_0)=\text{var}\{\text{phase}(S_{11}(x,y))|(\text{dist}(x,x_0)<d) \text{ and } (\text{dist}(y,y_0)<d)\}$$

wherein (x,y) is denotes a coordinate of an image pixel, $f_{amp}$ is a function derived from the amplitude of $S_{11}$, $f_{phase}$ is a function derived from the phase of $S_{11}$, var represents a variance function taken over points (x,y) such that the distance of x and $x^0$ is less than d and the distance of y and $y_0$ is less than d.

7. The method of claim I. wherein the given operating frequency is 100 GHz or more, wherein the wavelength is 3 mm or less, and wherein the sub-wavelength resolution of the image is 0.5 mm or less.

8. An imaging method, comprising;
    scanning a surface of a target object with electromagnetic energy having a wavelength at a given operating frequency;
    capturing reflected electromagnetic energy from the target object;
    measuring an intensity and phase of the reflected energy, wherein the measured intensity and phase of the reflected energy are $S_{11}$ parameters; and
    rendering an image of the target object using the measured intensity and phase of the reflected energy, wherein rendering the image comprises computing pixel values of the image as:

$$f_{amp}(x_0,y_0)=\text{var}\{\text{amp}(S_{11}(x,y))|(\text{dist}(x,x_0)<d) \text{ and } (\text{dist}(y,y_0)<d)\}$$

$$f_{phase}(x_0,y_0)=\text{var}\{\text{phase}(S_{11}(x,y))|(\text{dist}(x,x_0)<d) \text{ and } (\text{dist}(y,y_0)<d)\}$$

wherein (x,y) is denotes a coordinate of an image pixel, $f_{amp}$ is a function derived from the amplitude of $S_{11}$, $f_{phase}$ is a function derived from the phase of $S_{11}$, var represents a variance function taken over points (x,y) such that the distance of x and $x_0$ is less than d and the distance of y and $y_0$ is less than d,
    wherein the scanning and capturing is performed using a probe having sub-wavelength dimensions, and wherein the measuring and rendering is performed using a computer processor, and
    wherein the image is rendered having a sub-wavelength resolution.

9. The Method of claim 8, wherein the probe comprises an array of probe elements.

10. The method of claim 9, wherein the probe elements are loop-shaped elements.

11. The method of claim 10, wherein the loop-shaped elements each have a diameter of about 2 mm or less.

12. The method of claim 8, wherein the given operating frequency is 100 GHz or more, wherein the wavelength is 3 mm or less, and wherein the sub-wavelength resolution of the image is 0.5 mm or less.

* * * * *